United States Patent

[11] 3,587,625

| [72] | Inventor | Philippe Alexandre La Tronche, France |
|---|---|---|
| [21] | Appl. No. | 779,743 |
| [22] | Filed | Nov. 29, 1968 |
| [45] | Patented | June 28, 1971 |
| [73] | Assignee | Societe Generale de Constructions Electriques et Mecaniques (Alsthom) Grenoble, France |
| [32] | Priority | Dec. 1, 1967 |
| [33] | | France |
| [31] | | 5199 |

[54] SAFETY VALVES
8 Claims, 5 Drawing Figs.

[52] U.S. Cl. .................................................. 137/398,
137/421, 137/425, 137/426, 137/430, 251/234
[51] Int. Cl. ................................................ E03b 7/07,
F16k 21/04
[50] Field of Search .......................................... 137/391,
395, 396, 397, 398, 399, 409, 420, 421, 424, 425,
426, 430, 433; 251/234; 222/64, 66, 67; 4/58, 59,
60, 63, 56 (P.C.F. Digest)

[56] References Cited
UNITED STATES PATENTS

| 2,251,086 | 7/1941 | Van Dyke et al. | 137/433X |
| 2,699,653 | 1/1955 | Ponsar | 137/424X |
| 3,128,784 | 4/1964 | Parks | 137/424X |
| 3,285,276 | 11/1966 | Schipper | 137/433X |
| 3,374,802 | 3/1968 | Egleston | 137/433X |

Primary Examiner—William F. O'Dea
Assistant Examiner—David R. Matthews
Attorneys—Sylvester J. Liddy, John J. Hart, Joe E. Daniels and Charles E. Baxley ABSTRACT: The improved valve herein is composed of a valve member having a float which is submerged in a body of liquid and in its open position is located adjacently above a horizontal discharge opening for the liquid; the buoyancy of the float exerting an upward force on the valve member and the liquid discharging through the opening exerting a downward force on the valve member. The valve member also comprises a tube which extends up through the body of the liquid and ballast for balancing the surplus upward force thereon to place the valve member under an equilibrium which will enable it to close at a given flow value. Associated with the valve member are means for compensating for variations in its buoyancy due to variations in the level of the body of liquid in which it is located. These compensating means comprise a counterweight immersed in the body of liquid with the float and connected to means for applying to the tube forces which are equal to but opposite in direction to the liquid forces applied to the tube at the different levels of the liquid through which it extends.

INVENTOR
PHILIPPE ALEXANDRE
BY
John J. Hart
ATTORNEY

INVENTOR
PHILIPPE ALEXANDRE
BY
John J. Hart
ATTORNEY

SAFETY VALVES

THE INVENTION

This invention relates to safety valves of the type disclosed in French Patent No. 1,214,238 of Nov. 9, 1959, for association with submerged, horizontally disposed discharge openings in water towers, reservoirs, at the head of liquid supply systems, etc., to assure the automatic closing of such an opening when the rate of flow of the liquid out of the opening reaches too high a value, or when the level of the liquid drops too low.

Safety valves of the indicated type with which the invention is particularly concerned, are composed essentially of a vertically disposed movable valve member having at its lower end a float forming the closure for the discharge opening and a tube which extends upwardly from the float to project above the surface of the liquid. Such a valve member is subjected to a variable upward force, the magnitude of which is dependent on the rising force of the float and a downward force caused by the flow of the discharging liquid around the float. This upward force is balanced with ballast to place the member under an equilibrium which will enable it to close at any desired flow.

It has been found that when the aforesaid type of valve is used in situations in which substantial variations in the level of the liquid take place along said tube, such as s when it is used in a tank, there occur variations in the buoyancy of the tube which are so substantial that they cause the buoyancy of the movable valve member to vary with variations in the level of the tank and to such extent that the initial ballasted adjustment which had been effected for a given level of water, no longer holds for other levels that are substantially different from the level of adjustment.

It has been found further, that in some installations it is not desirable, or even possible, to adjust on the site the amount of ballast needed to place the movable valve member under the equilibrium required for the particular conditions present at such site.

One of the objects of the present invention is to provide in a valve of the indicated type, means capable of automatically compensating for any variation in the buoyancy of the tube at the different levels in the tank so that the initial ballasted adjustment of the movable valve member will be effective for all the variations in level which may occur in the tank.

Another object of the invention is to provide an improved valve of the indicated type which may be provided at the factory with a given ballast for certain hydraulic conditions, and which may be readily adjusted at the site to take care of different hydraulic conditions without disturbing the given ballast incorporated in the valve at the factory.

Other objects, as well as the advantages of the improved valve of this invention, will become apparent from the following description. It is believed advisable to point out at this time however, that in accordance with the invention the adjustment of the movable valve member to local hydraulic conditions is effected by varying the preset degree of valve opening by adjustment of the travel limit of such member. The compensation for variation in buoyancy is accomplished by associating with the movable valve member, a counterweight which extends down into the liquid to the minimum level for which it is desired to effect this compensation, and which is connected to the tube part of such valve member by a system such that the thrust which the counterweight receives from the liquid will produce on the valve member a force that is opposite in direction to such thrust. The counterweight is constructed to have for all of the heights of the level of the liquid, an immersed volume such that, taking into account possibly the construction of the connecting system, the said forces are equal in value. Thus, upon a change in the water level, the variation in thrust on the counterweight will cancel out the corresponding variation in thrust on the tube.

For a better understanding of the invention reference is made to the following description of the accompanying drawings, in which.

Figure 1:
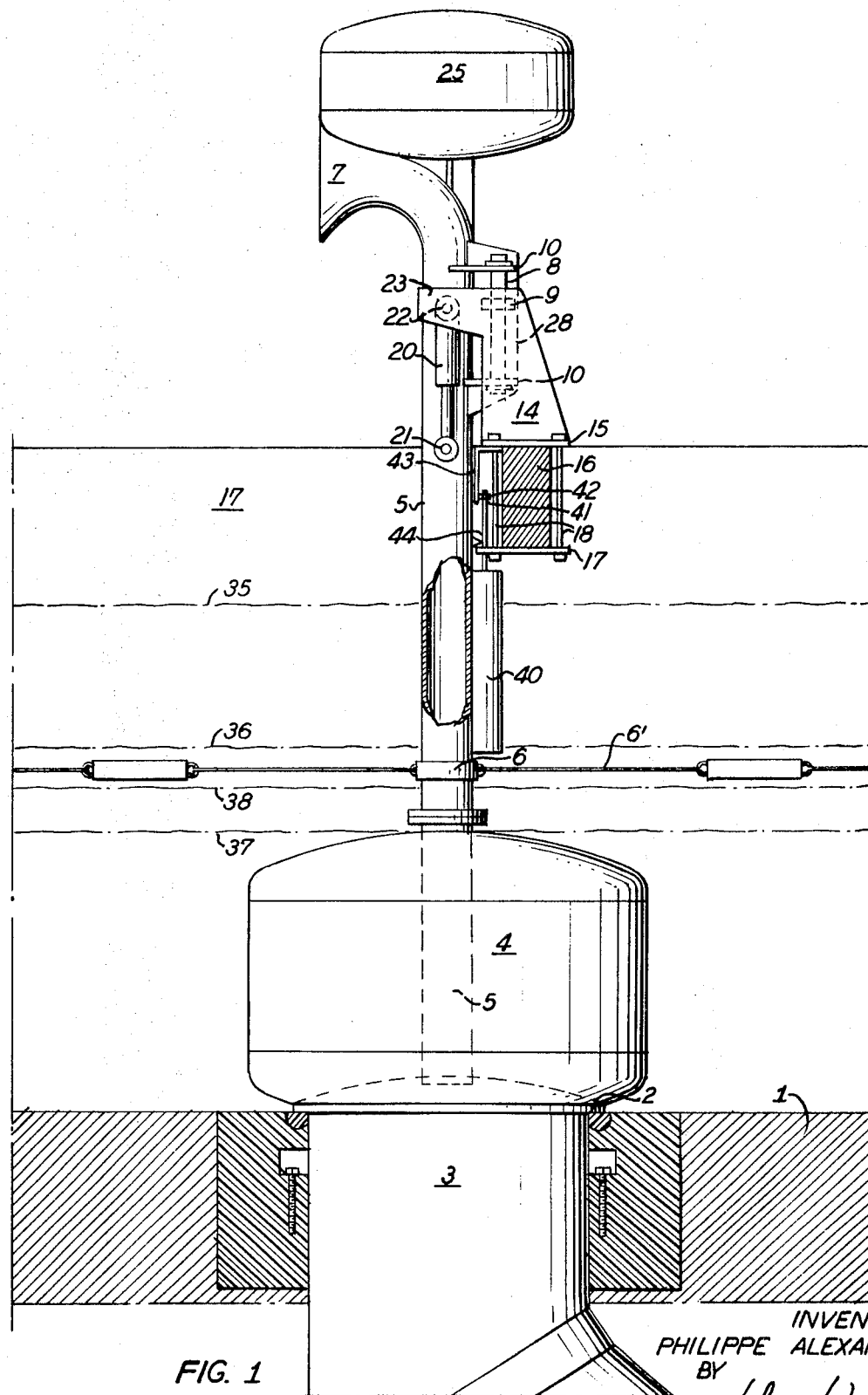
FIG. 1 shows by way of example, a side elevational view, partly in section, of a safety valve of the indicated type constructed in accordance with the invention.

In the drawings, in which similar reference numerals designate similar parts, the numeral 1 designates the bottom of a tank having a horizontal orifice 2 which constitutes the starting end of a feed pipe 3 which is fed with water from the tank. The rate of flow of the water into the orifice 2 is controlled by a float 4 forming part of a movable valve member which also includes a vertical stem 5 and a ballast member 25. The float 4 is welded onto the bottom end of the vertical stem 5 which is in the form of a tube and which rises above the highest level of the water in the tank. The tube 5 is provided at its upper end with an air inlet 7 that serves as an air vent. The tube 5 of the valve member is freely movable vertically in a guide 6 supported in the liquid by adjustable centering wires 6' connected to the sidewalls of the tank. The tube 5 is guided in its movements at its upper end by the coaction of two vertical, spaced guide rods 8,8 with a guide plate 9. The two rods 8,8 are connected at their upper and lower ends to two horizontal, vertically spaced plates 10,10 secured to the stem 5 in any suitable manner and accordingly are movable with the latter. The rods 8,8 pass through guide openings in the plate 9 which is secured at its ends to two vertically disposed, spaced bracket members 14,14 mounted on a plate 15. The plate 15 is seated on a beam 16 supported at its ends on the sidewalls 17 of the tank and is adjustably secured in such seated position on the beam 16 by a clamping plate 17 and bolts 18. The movements of the valve element are dampened by two oil brakes 20,20 connected at one end to pins 21,21 secured to opposite sides of the stem 5 and at their other ends to pins 22,22 provided on the extensions 23,23 of the two bracket members 14.

Figure 3:
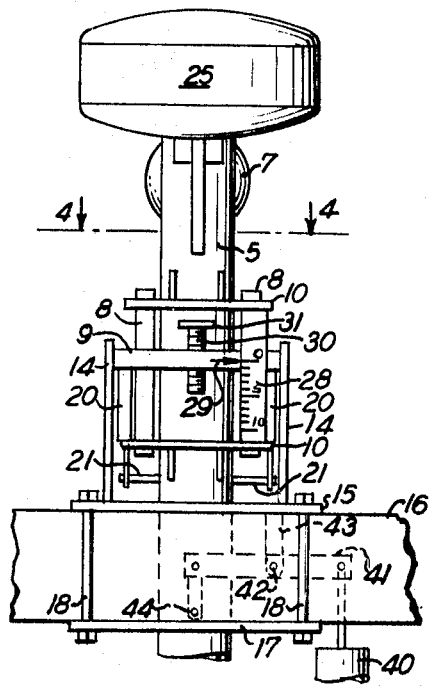
FIG. 3 is an elevational rear view looking at the right side of the parts shown in FIG. 2.

Mounted on the top of the stem 5 and balancing the rise force of the float is a ballast member 25 which forms part of the valve member and which may be constituted of a receptacle filled with ballast material or a weight of any suitable material or materials. In accordance with the invention, the amount of ballast required to balance the buoyancy of the float 4 and place the valve member under an equilibrium enabling the valve closing forces impressed on the float 4 by the liquid discharging into the feed pipe 3 to close such valve means at a given flow rate estimated for a given head, is carefully determined at the factory and incorporated in the valve as it is made. It will be understood that as is customary with this type of valve member, as soon as the given flow value is reached and the closing movement of the valve started, such movement is uninterrupted and the valve member always goes to complete closure and never stops at an intermediate position. Also incorporated in the valve means for bringing about the closure of the valve for other flow rates from such estimated value which is the maximum selected value, down to as much as one-tenth of this value without affecting the accuracy or the sensitivity of the closing action of the valve. As is shown in the drawings such adjusting means comprises a vertically disposed graduated scale 28 indexed from 0—10. The lower value "10" on the scale indicates the maximum selected rate of flow for which the ballast has been adjusted at the factory and is the rate of flow at which the valve is set to close if not further adjustment from the factory setting is made. Associated with the scale 28 is an index member or pointer 29 in FIG. 3 provided on the plate 9 carried by the brackets 14,14. In the closed position of the valve the pointer will designate "0" on the scale 28 as is shown more clearly in FIG. 3 of the drawings. Also threaded in the plate 9 is a vertically disposed adjustable stop 30 having a manually manipulatable handwheel 31 and coactable with the lower plate 10 to define the range of movement of the valve element. It will be understood from the foregoing that when the travel limit of the valve is adjusted at the factory for the estimated amount of ballast which has been incorporated therein, the adjustment of the stop 30 is such that in the open position of the valve such stop will come into engagement with the lower or bottom plate 10 when the index member 29 points to "10" on the scale 28. Assuming now that hydraulic conditions at the site to which the valve has been delivered are such that the valve should close at a lower flow rate than the factory estimated rate, for example, at approximately, seven-tenths of the maximum selected liquid discharge at which the set equilibrium of the valve member would be overcome by the closing forces acting on the float 4 as a result of such discharge. By manipulating the handwheel 31, the stop 30 is readjusted so that, as is indicated in FIG. 3, the index member will point to the seventh graduation on the scale 28 when such stop comes into contact with the bottom plate 10 in the fully open position of the valve member. By thus manipulating the stop 30 any travel limit and consequently any flow rate at which it is desired that the valve may be caused to close can readily be selected without any sacrifice of the accuracy and sensitivity of the valve. While the estimated ballast has been shown as applied to the top of the valve, it will be understood that it is within the contemplation of this invention to apply such ballast to any portion of the stem 5, or even to apply it to the float 4.

It will be understood further from the foregoing that when the liquid flows from the tank into the pipe 3 as indicated by the arrows $f2$ in FIG. 1 of the drawings, the buoyancy which has been given to the valve member by the float 4 and the ballast 25 will be decreased because of the head loss caused by such flow and by an amount which depends on the rate of such flow into the pipe 3 and the location of the float 4. By suitably adjusting the travel of the valve member in the manner above indicated, the valve member may be adjusted to close at any required flow. In its vertical movements, the valve member will be confined to a fixed path by reason of the spaced guide rods 8,8 and the guide plate 9. Further, when the water level falls sufficiently so that the float 4 loses part of its buoyancy, the valve member will close before the tank is empty. Thus, with this type of valve member, one can make certain that the rate of flow will not exceed a predetermined value established by adjustment of the valve, and that the flow will be stopped before the tank becomes empty, thereby avoiding any prolonged operation of the pipeline 3 with the entrainment of air. Means are provided as is known to the art to ensure slow filling of the pipe 3 after such closure of the valve member. As soon as the pipe is full, the pressure equilibrium about the float 4 is reestablished and the valve member reopens automatically to resume its normal operation. As is indicated in FIG. 1 of the drawings, the levels designated 35 and 36 are, respectively, the normal maximum and minimum levels which are maintained in the tank, while the level 37 is the absolute minimum level which brings about the safety closing of the valve member. The height of this level 37 is substantially equal to the height of the float 4 when the latter is in closed position, as is shown in FIG. 1.

Arranged vertically alongside the tube 5 is a counterweight 40 supported in suspended condition by one end of a lever 41 pivoted on a pin 42 carried by a vertical bracket 43 depending from the plate 15. The other end of the lever 41 is connected to a pin 44 affixed to the tube 5 in any suitable manner. The two arms of the lever 41 on each side of the pin 42 are equal. The counterweight 40 is of uniform cross-sectional area throughout its length and such cross-sectional area in the embodiment of FIGS. 1—3, is equal to the annular cross-sectional area of the tube 5.

It will be understood that with the aforesaid arrangement, when the water level 35 changes, causing a variation in the immersion of the tube 5 and therefore a variation in its buoyancy, the latter is compensated for by the variation in buoyancy, produced by this change of the water level on the counterweight 40. These adjustments of the movable valve member which are effected by the counterweight will be valid for all the variations in level which may occur in the tank, so that the closing of the valve will take place always at the same rate of flow whatever the height of the level of the adjustment of the valve member. As before indicated, the tendency to float at zero rate of flow of the assembly constituted of the movable valve member and the counterweight is controlled by the ballasting of such valve member, and the closing of the valve for a given rate of flow is regulated by adjustment of its opening stroke. The aforesaid compensation in buoyancy will take place in the embodiment of FIG. 1, for levels ranging from the maximum upper level 35 to a lower level 38, the height of which is the same as that of the upper surface of the float 4 when the latter is in open position. The lower level 38 is so selected because no compensation in buoyancy is necessary below this height. As a matter of fact, below this height a drop in the water level will cause the automatic closing of the valve because the variation in buoyancy of the immersed float 4 that will then be superimposed on that of the tube 5 will effect such closing.

Figure 2:
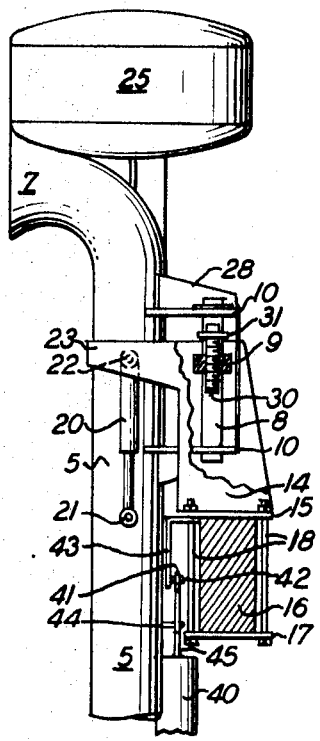
FIG. 2 is a similar view showing additional details of construction in the upper portion of the valve member.
Figure 4:
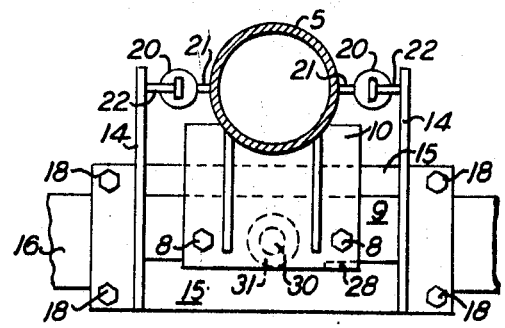
FIG. 4 is a sectional view looking along the line 4—4 in FIG. 3.

As shown in FIGS. 1—3 of the drawings, the cross-sectional areas of the tube are constant, as is most frequently the case. Accordingly, the cross-sectional areas of the counterweight 40 should also be constant, and when the connecting system assures the transmission of the forces without deformation, these two cross-sectional areas are equal. However, the cross-sectional areas of the tube may vary, in which case the cross-sectional areas of the counterweight 40 will correspondingly vary to effect the desired compensating effects. These two cross-sectional areas may also be varied when the connecting system has a tendency to deform the forces transmitted. Further, the cross-sectional areas of the counterweight may be a multiple or submultiple of the annular cross-sectional areas of the tube 5 provided on the valve member and this difference is compensated by the construction of the connecting system. Further, in the embodiment of FIGS. 1—3, the lengths of the arms of the lever 41 on each side of the pin 42 may be made unequal. In such case, the same buoyancy compensating action may then be obtained by giving the counterweight 40 a cross section with respect to that of the tube which would be inversely proportional to the ratio of the lengths of the arms.

Figure 5:
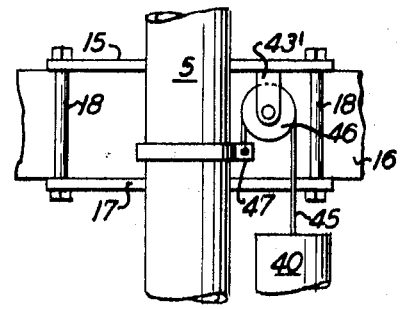
FIG. 5 is an elevational view showing a variant of the compensation device.

It will be understood that he compensating forces may be transmitted by other means than the lever arrangement shown in FIG. 1 of the drawings. Thus, as is shown in FIG. 5 of the drawings, the counterweight 40 may be held suspended by one end of a cable 45 which passes over a pulley 46 rotatably mounted on the vertical bracket 43' depending from the plate 15 and which is fastened at its other end to the pin 47 of a clamp affixed to the tube 5. As in the embodiment of FIG. 5 the cross section of the counterweight 40 is equal to the annular cross section of the tube 5, the same buoyancy action is effected by the force transmitting means disclosed therein, as is accomplished by the lever arrangement of FIGS. 1—3. Any differences in the cross-sectional areas of the tube 5 and the counterweight 40 in the embodiment of FIG. 5 can be compensated for by the use of pulleys as is known in the art.

It will be apparent that other variations may be made in the invention without departing from the spirit thereof, or the scope of the appended claims.

I claim:

1. A safety valve member composed of a float to be submerged in a body of liquid to a position adjacently above a horizontal discharge opening for the liquid, a vertically disposed tube connected to said float and extending up through the body of liquid in which such member is located, and means for compensating for variations in the buoyancy of the tube due to variations in the level of such body of liquid, said compensating means comprising means extending in the liquid from a given maximum level to the minimum level of the body of liquid for which it is desired to effect such compensation, and means connecting said extending means to the tube and constructed and arranged to transmit to the tube under the thrust it receives from the body of liquid at the different heights of the level of the liquid, forces which are substantially equal in value to the forces that are applied by the thrust of the same liquid to the tube at the different levels, and which are applied thereby to the tube in a direction opposite to that at which the thrust forces of the liquid are applied to the tube.

2. A safety valve member as defined in claim 1, in which said extending means comprises a counterweight having given immersed volumes for all heights of the level of the liquid, and in which said connecting means holds said counterweight suspended in said body of liquid.

3. A safety valve member as defined in claim 2, in which said connecting means comprises a lever, means pivotally supporting said lever intermediate its ends, means connecting one arm of said lever to said counterweight, and means connecting the other arm of said lever to said tube.

4. A safety valve member as defined in claim 2, in which said connecting means comprises a cable connected at one end to said counterweight and connected at its other end to said tube, and pulley means supporting the intermediate portion of said cable.

5. A safety valve member composed of a float to be submerged in a body of liquid to a position adjacently above a horizontal discharge opening for the liquid, a vertically disposed tube connected to said float and extending up through the body of liquid in which such member is located, ballast of a given weight carried by said valve member to give the latter an equilibrium such as to enable the valve member to close at a flow rate past said float exceeding a predetermined value, and means for decreasing the effective closing flow rate of the valve member below said predetermined valve comprising a pair of cooperative means, one of said cooperative means being secured to said valve member, and the other of said cooperative means being secured to a fixed member, and adjustable stop means mounted on said cooperative means and controlling the range of movement therebetween.

6. A safety valve member as defined in claim 5, including cooperative index means connected to said cooperative means and indicating the range of relative movement of said cooperative means.

7. A safety valve member as defined in claim 5, including dampening means connected to one of said cooperative means for dampening the movements of said valve member.

8. A safety valve member as defined in claim 5, in which one of said cooperative means comprises a pair of spaced vertically disposed guide rods, and the other of said cooperative means comprises a horizontal guide bar having spaced openings through which said guide rods extend.